Figures 1, 2:
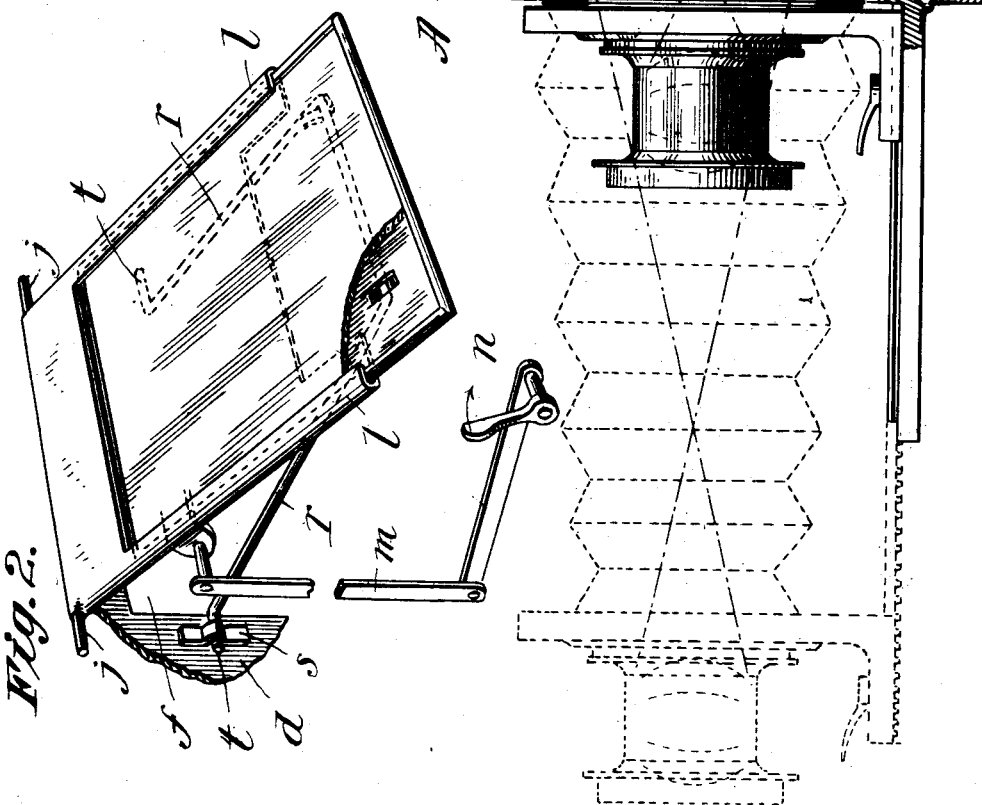

No. 713,629. Patented Nov. 18, 1902.
J. D. GARFIELD.
FINDER FOR CAMERAS.
(Application filed Mar. 17, 1902.)

(No Model.)

Witnesses:
M. A. Campbell

Inventor,
Julius D. Garfield

UNITED STATES PATENT OFFICE.

JULIUS D. GARFIELD, OF SPRINGFIELD, MASSACHUSETTS, ASSIGNOR OF ONE-HALF TO GEORGE BERNARD, OF BOSTON, MASSACHUSETTS.

FINDER FOR CAMERAS.

SPECIFICATION forming part of Letters Patent No. 713,629, dated November 18, 1902.

Application filed March 17, 1902. Serial No. 98,489. (No model.)

*To all whom it may concern:*

Be it known that I, JULIUS D. GARFIELD, a citizen of the United States of America, and a resident of Springfield, in the county of Hampden and State of Massachusetts, have invented certain new and useful Improvements in Finders for Cameras, of which the following is a full, clear, and exact description.

This invention relates to swinging or pivoted mirrors for cameras of that class in which an inclined swinging mirror located in front of the sensitized plate or film is used in focusing the picture to deflect the rays passing through a lens onto a horizontally-disposed ground-glass plate located at the top of the camera.

It has been found heretofore that in a camera of this kind of small enough dimensions (from the lens to the sensitized plate) to permit the use of a lens of short focal length the limited size of a mirror that would swing within such limited dimension was not large enough to reflect all the rays from a lens of longer focus. To obviate this difficulty, I have constructed a mirror that is adapted to slide longitudinally in a suitable pivoted frame and have provided means for regulating automatically the distance the mirror shall slide in its frame. Thus in a space necessarily limited to the focus of a small lens I am able to swing a mirror that will encompass the rays from a lens of much longer focus and which heretofore would have required correspondingly longer space in which it could swing.

It is very desirable often to remove one combination of a double lens for the purpose of obtaining as a single lens a larger image of the picture with the same lens, which increases the focus usually about twice that when used as a double lens. It is also desirable to use lenses of different focal length in the same camera. I am also enabled to furnish a camera that may be sold exactly as the ordinary view-camera—that is, without a lens fitted to it—as such camera is adapted to any lens.

The invention consists in a camera having usually an exposing-space of greater height than its front-to-rear extent and having a ground-glass screen at its top, a deflecting-mirror of less width than the front-to-rear extent of said space and arranged to assume positions horizontally closely under and parallel with the screen and at an inclination both to the screen and the longitudinal line of the camera, and means for causing the mirror in swinging from its upper horizontal position into its downward forward inclination to also have a bodily-descending movement within the said exposing-space; and the invention further consists in the constructions and combinations of parts hereinafter described, and set forth in the claims.

In the drawings, Figure 1 is a longitudinal section of a camera, showing the mirror in its inclined position. Fig. 2 is a perspective view of the mirror and devices for operating the same.

In the drawings, A is a camera of the type in which focusing from the exposing-lens $a$ is done by deflecting the image projected through the lens by an indirect swinging mirror onto a horizontally-arranged ground-glass focusing-screen and consists in detail of the plate-holding compartment $a$. A plate-holder $b$ (shown in dotted lines) has the approximate focal plane of sensitized surface of a photographic plate, (indicated by the broken line $c$.) Directly and in front of the focal plane $c$ is the rear wall $d$ of the exposing-chamber $e$. This wall $d$ in the camera shown consists of a thin metal plate having an opening $f$ of about the size of the photographic plate to be exposed.

Near the top and extending from the wall $d$ to the front wall of the camera, and of the exposing-chamber $e$ thereof, and reaching across the entire width of the camera is a frame $g$, supporting on its upper side the focusing-screen $h$ and provided on its under side with a rabbet or rectangular depression $i$.

At the rear end of the frame $g$ and pivotally supported thereon by the pins $j$ is a mirror frame or carrier $k$, which in this case, and as shown, consists of a sheet-metal envelop or case having the upper face thereof cut out nearly to the side edges thereof, Fig. 2, thus leaving the side flanges $l\ l$. At one side of this mirror-frame and near the pivotal edge thereof is located the point of attachment of the ordinary operating-levers $m$, which are operated to raise the mirror-frame into the light-excluding position within the depression $i$, as shown in dotted lines in Fig. 1.

The means on the outside of the camera-box I prefer to use is a vertical thumb-lever $n$, which is a part of and integral with the levers $m$.

Supported on and adapted to slide in the above-described mirror-frame $k$ is the mirror $o$, whose back and edges are provided with a sheet-metal backing $q$, and at the points $q\ q$ on said metal backing are provided loops or eyes through which is passed a wire the extremities of which at either side of the mirror are bent at nearly right angles to this first-mentioned portion, and thus constitute the levers $r\ r$.

At suitable and prearranged points on the rear wall $d$ and somewhat below the pivots $j\ j$ and at either side of the opening $f$ therein are the bearing-points $s\ s$, through which the short bent portions $t\ t$ of the levers $r\ r$ are pivotally supported.

By referring again to Fig. 1 of the drawings, and especially to the arcs described by the outer extremities of the mirror-frame $k$ and of the mirror $o$, it will be seen that to swing a focusing-mirror of the ordinary construction having its outer or free end as at $x$ would necessitate making the exposing-chamber of the camera of considerably greater dimensions longitudinally, which would prevent the use of a lens of short focus, and, on the other hand, if an exposing-chamber of the proportion suitable for a lens of short focus is used—such, for instance, as shown in Fig. 1—a swinging mirror of the ordinary kind, having its outer or free end as at $y$, would not suffice to encompass or deflect all of the rays from a lens of long focus, as will be understood by reference to the dotted indications of the rays from the lens, which latter is shown in full lines in Fig. 1, as compared with the rays from the lens shown in dotted lines.

Having thus described my invention, what I claim, and desire to secure by Letters Patent, is—

1. In a camera, the combination, with the camera-case having an exposing-space and the ground glass at the top of the exposing-space, of a mirror-carrier pivotally supported in an upper part of the exposing-space, a mirror adapted to swing bodily with the carrier and also to have a sliding movement relatively thereto, means for imparting a swinging movement to the mirror-carrier, and means connected with the mirror for constraining the latter, in a swinging movement of the carrier, to slide and assume a changed location relatively to, the carrier.

2. In a camera, the combination with the camera-case having an exposing-space and the ground glass at the top of the exposing-space, of a mirror-carrier pivotally supported in an upper part of the exposing-space, a mirror supported by and adapted to swing bodily with the carrier, and also to have a sliding movement relatively thereto, means for imparting a swinging movement to the mirror-carrier, and a member connected with the mirror and pivotally connected to a part of the camera at a point removed from the pivotal connection of the mirror-carrier.

3. A camera constructed with an exposing-space, having a screen at its top, a lens at its front, and provisions for the accommodation of a photographic plate at its rear, a mirror-carrier pivoted at a rear upper portion of the exposing-space under and adjacent the screen, and adapted to be swung horizontally closely under the screen, and to be swung downwardly-forwardly-inclined position, and means for operating the carrier, a mirror slidably supported on the swingable carrier, and a member pivoted below the mirror-carrier pivot and having also pivotal connection with a forward portion of the mirror.

4. In a camera having an exposing-space of greater height than its front-to-rear extent, and having a ground-glass screen at its top, a deflecting-mirror of less width than the front-to-rear extent of said space, and arranged to assume positions: longitudinally closely under and parallel with the screen, and at an inclination both to the screen and the longitudinal line of the camera, and means for causing the mirror in swinging from its upper horizontal position into its downward forward inclination, to have also a bodily-descending movement within the exposing-space.

Signed by me at Springfield, Massachusetts, this 26th day of February, 1902.

JULIUS D. GARFIELD.

Witnesses:
WM. S. BELLOWS,
M. A. CAMPBELL.